United States Patent

Black et al.

[11] Patent Number: 5,619,408
[45] Date of Patent: Apr. 8, 1997

[54] METHOD AND SYSTEM FOR RECODING NONEFFECTIVE INSTRUCTIONS WITHIN A DATA PROCESSING SYSTEM

[75] Inventors: Bryan Black; Marvin A. Denman; Lee E. Eisen; Robert T. Golla, all of Austin; Albert J. Loper, Jr., Cedar Park; Soummya Mallick; Russell A. Reininger, both of Austin, all of Tex.

[73] Assignee: International Business Machines Corporation, Armonk, N.Y.

[21] Appl. No.: 387,145

[22] Filed: Feb. 10, 1995

[51] Int. Cl.⁶ .............................. G05B 15/00; G06F 9/30
[52] U.S. Cl. .................. 395/567; 364/231.8; 364/263.1; 364/DIG. 1; 364/948.34; 364/DIG. 2; 395/800; 395/384
[58] Field of Search .............................. 371/16; 395/375, 395/800; 364/DIG. 1, DIG. 2, 131–136

[56] References Cited

U.S. PATENT DOCUMENTS

| | | |
|---|---|---|
| 4,398,247 | 8/1983 | Bazlen et al. . |
| 4,639,865 | 1/1987 | Martin . |
| 4,642,757 | 2/1987 | Sakamoto . |
| 4,701,842 | 10/1987 | Olnowich . |
| 4,710,866 | 12/1987 | Zolnowsky et al. ............. 371/16 |
| 4,757,445 | 7/1988 | Zolnowsky et al. ............. 371/16 |
| 4,761,734 | 8/1988 | van Meerbergen . |
| 4,773,002 | 9/1988 | Iwasaki et al. . |
| 4,962,312 | 5/1990 | Nukiyama . |
| 5,019,967 | 5/1991 | Wheeler et al. . |
| 5,031,096 | 7/1991 | Jen et al. . |
| 5,056,004 | 10/1991 | Ohde et al. . |
| 5,109,381 | 4/1992 | Duxbury et al. . |
| 5,163,139 | 11/1992 | Haigh et al. . |
| 5,193,158 | 3/1993 | Kinney et al. . |

FOREIGN PATENT DOCUMENTS

| | | |
|---|---|---|
| 241802A1 | 12/1986 | Germany . |
| 58-195961 | 11/1983 | Japan . |
| 59-49644 | 3/1984 | Japan . |
| 60-103450 | 6/1985 | Japan . |
| 60-207935 | 10/1985 | Japan . |
| 61-221939 | 10/1986 | Japan . |
| 62-214440 | 9/1987 | Japan . |

Primary Examiner—Paul P. Gordon
Assistant Examiner—Thomas Brown
Attorney, Agent, or Firm—Michael A. Davis, Jr.; Andrew J. Dillon

[57] ABSTRACT

A method and system are disclosed for processing instructions within a data processing system including a processor having a plurality of execution units. According to the method of the present invention, a number of instructions stored within a memory within the data processing system are retrieved from memory. A selected instruction among the number of instructions is decoded to determine if the selected instruction would be noneffective if executed by the processor. In a preferred embodiment of the present invention, noneffective instructions include instructions with invalid opcodes and instructions that would not change the value of any data register within the processor. In response to determining that the selected instruction would be noneffective if executed by the processor, the selected instruction is recoded into a specified instruction format prior to dispatching the selected instruction to one of the number of execution units. Detecting noneffective instructions prior to dispatch reduces the decode logic required within the dispatcher and enhances processor performance.

11 Claims, 6 Drawing Sheets

METHOD AND SYSTEM FOR RECODING NONEFFECTIVE INSTRUCTIONS WITHIN A DATA PROCESSING SYSTEM

BACKGROUND OF THE INVENTION

1. Technical Field

The present invention relates in general to a method and system for data processing, and in particular, to a method and system for processing instructions within a data processing system. Still more particularly, the present invention relates to a method and system for recoding noneffective instructions within a data processing system.

2. Description of the Related Art

Figure 1:
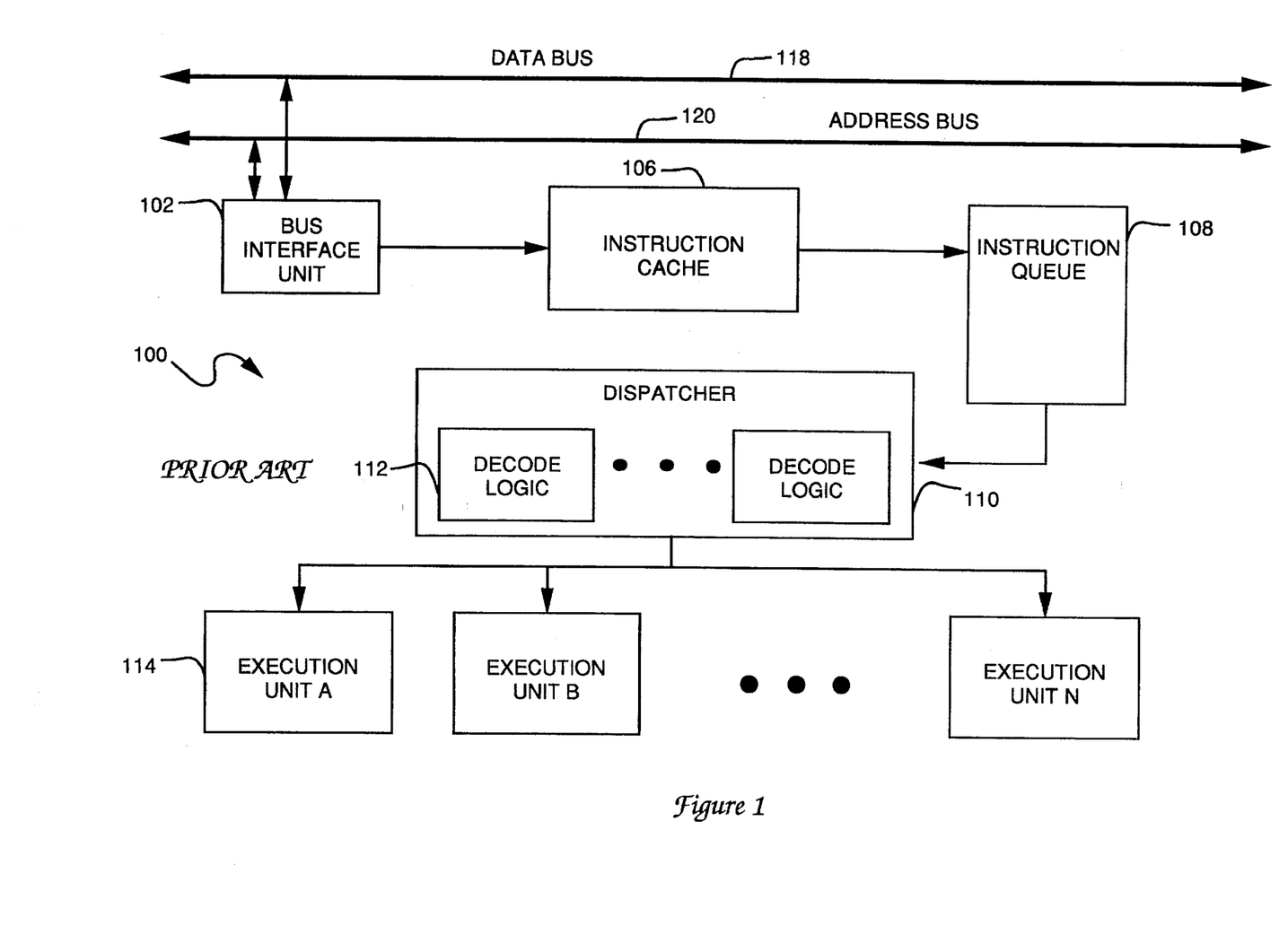
FIG. 1 illustrates a prior art instruction processing subsystem of a superscalar processor.

In order to satisfy consumer demand for high performance data processing systems, processor designers have developed several architectural improvements to enhance processor performance, including the use of superscalar architecture and pipelined execution units. With reference now to FIG. 1, there is illustrated a typical instruction processing subsystem within a superscalar pipelined processor. As depicted, instruction processing subsystem 100 includes bus interface unit 102, instruction cache 106, instruction queue 108, dispatcher 110, and a number of execution units 114. Instruction processing subsystem 100 typically includes, for example, an integer processing unit, a floating point unit, and a load/store unit among execution units 114.

As will be understood by those skilled in the art, instruction cache 106 is a small block of expensive, high speed memory that stores a subset of the instructions which may be accessed by the processor. In general, instructions are stored within instruction cache 106 in association with an address tag, i.e., a portion of the absolute address at which the instructions are stored at a lower level of memory. When the processor requests an instruction, the processor first searches instruction cache 106 to determine if the requested instruction is resident within instruction cache 106. Those skilled in the art will appreciate that if a requested instruction is not resident within instruction cache 106, a cache miss occurs and the instruction request is forwarded to a lower level of memory via bus interface unit 102 and address bus 120. In response to the instruction request, the lower level memory (e.g., a level two (L2) cache) which stores the requested instruction transmits the memory segment (e.g., cache line) containing the requested instruction to bus interface unit 102 via data bus 118. The instructions within the returned memory segment are then stored within instruction cache 106 in place of other instructions, which are selected according to a least recently used (LRU) replacement algorithm, for example.

When the processor requests an instruction stored within instruction cache 106, the requested instruction is loaded into instruction queue 108, which sequentially stores several instructions that will be executed within the processor. As the processor executes instructions, the oldest instruction within instruction queue 108 is loaded by dispatcher 110, which includes one decode logic unit 112 for each instruction within the dispatch bandwidth of dispatcher 110. For example, if dispatcher 110 dispatches three instructions each cycle, dispatcher 110 includes three decode logic units 112. Those skilled in the art will appreciate that in order to enhance performance, the instruction dispatch bandwidth of dispatcher 110 is preferably the same or approximately the same as the number of execution units 114.

Typically, each decode logic unit 112 comprises a multi-level logic circuit which partially decodes instructions by comparing bits within the instructions' operation codes (opcodes) with bit patterns corresponding to valid instructions within the processor's instruction set. If the decode of an instruction indicates that the instruction is illegal (i.e., the instruction has an invalid opcode), dispatcher 110 forwards the illegal instruction to a completion buffer (not illustrated) without attempting to execute the illegal instruction. Legal instructions, on the other hand, are dispatched to an execution unit 114 corresponding to the instruction type determined by the decode operation.

As will be understood by those skilled in the art, each execution unit 114 comprises a multiple stage execution pipeline, including, for example, fetch, decode, execution, and completion stages. By dividing the execution of each instruction into several discrete steps, each execution unit 114 is able to process an instruction at each of its multiple stages during each processor clock cycle. Typically, after legal instructions that precede an illegal instruction in the instruction stream have completed execution within an execution unit 114, a selected exception (interrupt) handler is executed to process the illegal instruction.

Although processors utilizing an instruction processing subsystem like that depicted in FIG. 1 provide enhanced performance compared with conventional scalar processors, processor efficiency and performance remain less than optimal due to the processor's mechanism for detecting and handling illegal instructions. Because illegal instruction detection and handling are performed in a critical timing path, the processing delay generated by each logic gate within the multi-level logic network in each decode logic unit 112 slows overall processor performance. In addition, as the dispatch bandwidth of a processor increases, the amount of processor area allocated to illegal instruction detection logic within dispatcher 110 concomitantly increases, which in turn dramatically increases the cost of processor fabrication.

Figure 2:
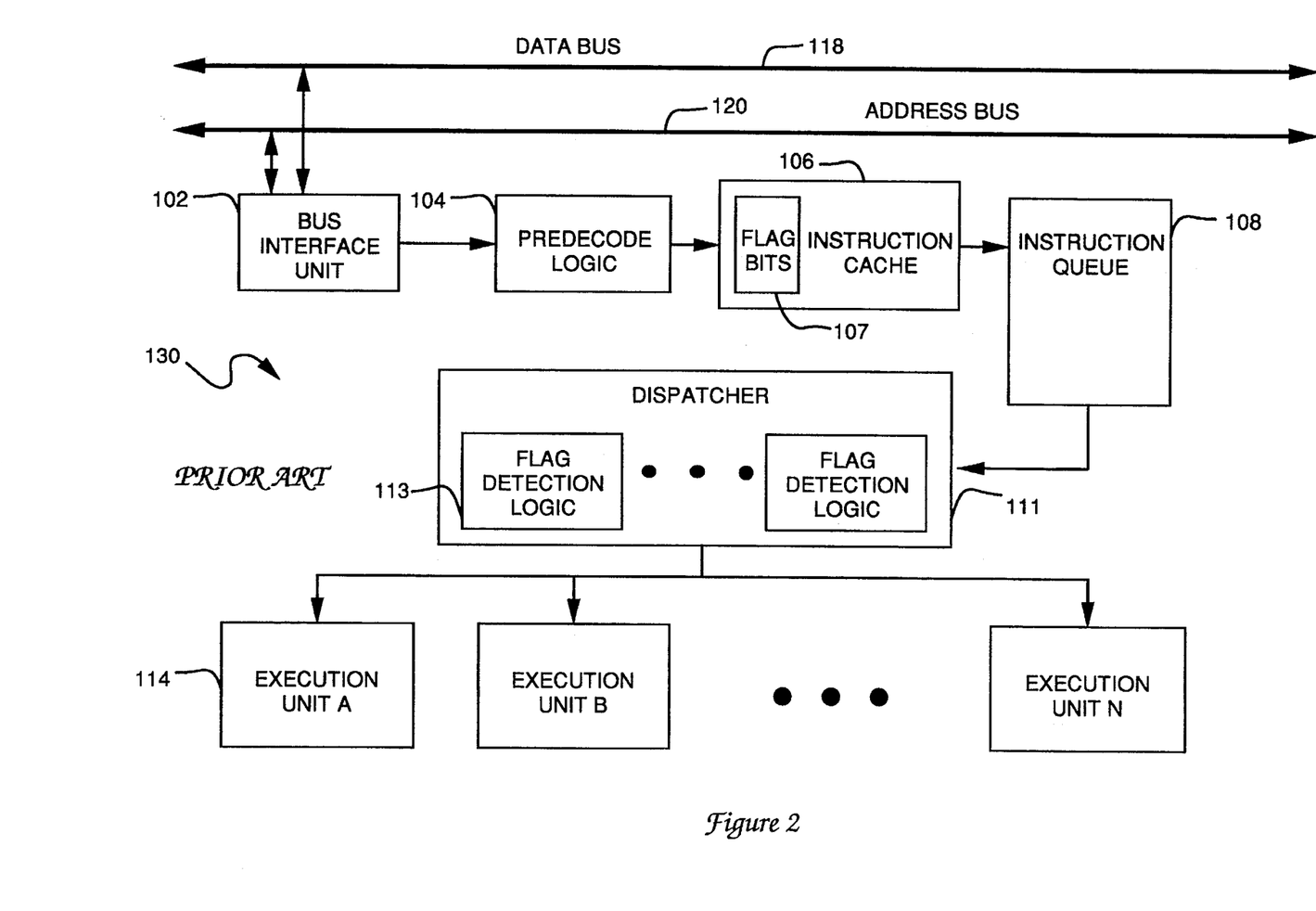
FIG. 2 depicts a second prior art instruction processing subsystem of a superscalar processor.

Referring now to FIG. 2, there is depicted an improved conventional instruction processing subsystem of a superscalar pipelined processor. As indicated by like reference numerals, instruction processing subsystem 130 includes bus interface unit 102, instruction cache 106, instruction queue 108, and a number of execution units 114, which operate like corresponding components within instruction processing subsystem 100 illustrated in FIG. 1. Instruction processing subsystem 130, however, also includes predecode logic 104 which predecodes the instructions within a memory segment returned from lower level memory prior to storage of the instructions within instruction cache 106. Typically, predecode logic 104 compares selected bits within the opcode portion of each instruction with a bit pattern corresponding to valid instruction types within the processor's instruction set. Utilizing the results of this comparison, predecode logic 104 sets flag bits 107, which specify an instruction type for each instruction. In addition, if the comparison indicates that an instruction has an invalid opcode, predecode logic 104 sets a bit within flag bits 107 to indicate that the instruction has an illegal opcode. As illustrated, flag bits 107 associated with each instruction are stored within instruction cache 106.

Continuing along the instruction processing path, dispatcher 111 contains one flag detection logic unit 113 for each instruction within the dispatch bandwidth of dispatcher 111. When an instruction is loaded by dispatcher 111, one of flag detection logic units 113 examines flag bits 107 associated with the instruction and assigns the instruction to an execution unit 114 corresponding to the instruction type indicated by flag bits 107. Partially decoding instructions prior to loading the instructions into dispatcher 111 reduces the complexity of the decode logic required within dispatcher 111 since only flag bits 107 must be analyzed to assign instructions to the appropriate execution unit 114. This decrease in the decode logic within dispatcher 111 decreases the logic gate delays within dispatcher 111, thereby enhancing overall processor performance.

Although instruction processing subsystem 130 enjoys enhanced performance versus instruction processing subsystem 100 of FIG. 1 due to the decrease in logic gate delays in a critical timing path, the improvement in processor performance entails an increase in processor cost since storing flag bits within the instruction cache reduces the number of instructions which may be stored within a given cache size. In order to avoid an increase in the instruction cache miss ratio (and consequent performance degradation) due to the reduction in resident instructions, the instruction cache size must be increased to compensate for the storage consumed by the flag bits. However, those skilled in the art will appreciate that substantially increasing the size of the instruction cache may render the processor prohibitively expensive to consumers.

A source of inefficiency within instruction processing subsystems that is unaddressed by either of the prior art systems depicted in FIGS. 1 and 2 is the utilization of processor cycle time to execute instructions which do not alter the state of the processor. In other words, instruction processing subsystems consume processor cycle time processing instructions that do not change the value of any architected register within the processor. Instructions that do not affect the state of the processor include, for example, instructions which add 0 to or subtract 0 from data within a register, and instructions that multiply or divide a register value by 1, etc. Although these instructions do not change the state of any architected register, they degrade the performance of the processor since the execution of these instructions may require several processor cycles. Therefore, it would be desirable to detect instructions which do not affect the state of the processor and remove these noneffective instructions from the instruction stream or replace them with no operation (no-op) instructions, which typically execute within a single processor cycle.

Consequently, it would be desirable to provide an efficient method and system within a superscalar pipelined processor for detecting noneffective instructions with illegal opcodes and noneffective instructions which do not change the state of architected registers within the processor. Furthermore, it would be desirable to provide a method and system within a superscalar pipelined processor for detecting noneffective instructions which do not increase the size, and therefore cost, of the processor.

SUMMARY OF THE INVENTION

It is therefore one object of the present invention to provide an improved method and system for data processing.

It is another object of the present invention to provide an improved method and system for processing instructions within a data processing system.

It is yet another object of the present invention to provide an improved method and system for recoding noneffective instructions within a data processing system.

The foregoing objects are achieved as is now described. A method and system are disclosed for processing instructions within a data processing system including a processor having a plurality of execution units. According to the method of the present invention, a number of instructions stored within a memory within the data processing system are retrieved from memory. A selected instruction among the number of instructions is decoded to determine if the selected instruction would be noneffective if executed by the processor. In a preferred embodiment of the present invention, noneffective instructions include instructions with invalid opcodes and instructions that would not change the value of any data register within the processor. In response to determining that the selected instruction would be noneffective if executed by the processor, the selected instruction is recoded into a specified instruction format prior to dispatching the selected instruction to one of the number of execution units. Detecting noneffective instructions prior to dispatch reduces the decode logic required within the dispatcher and enhances processor performance.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 3:
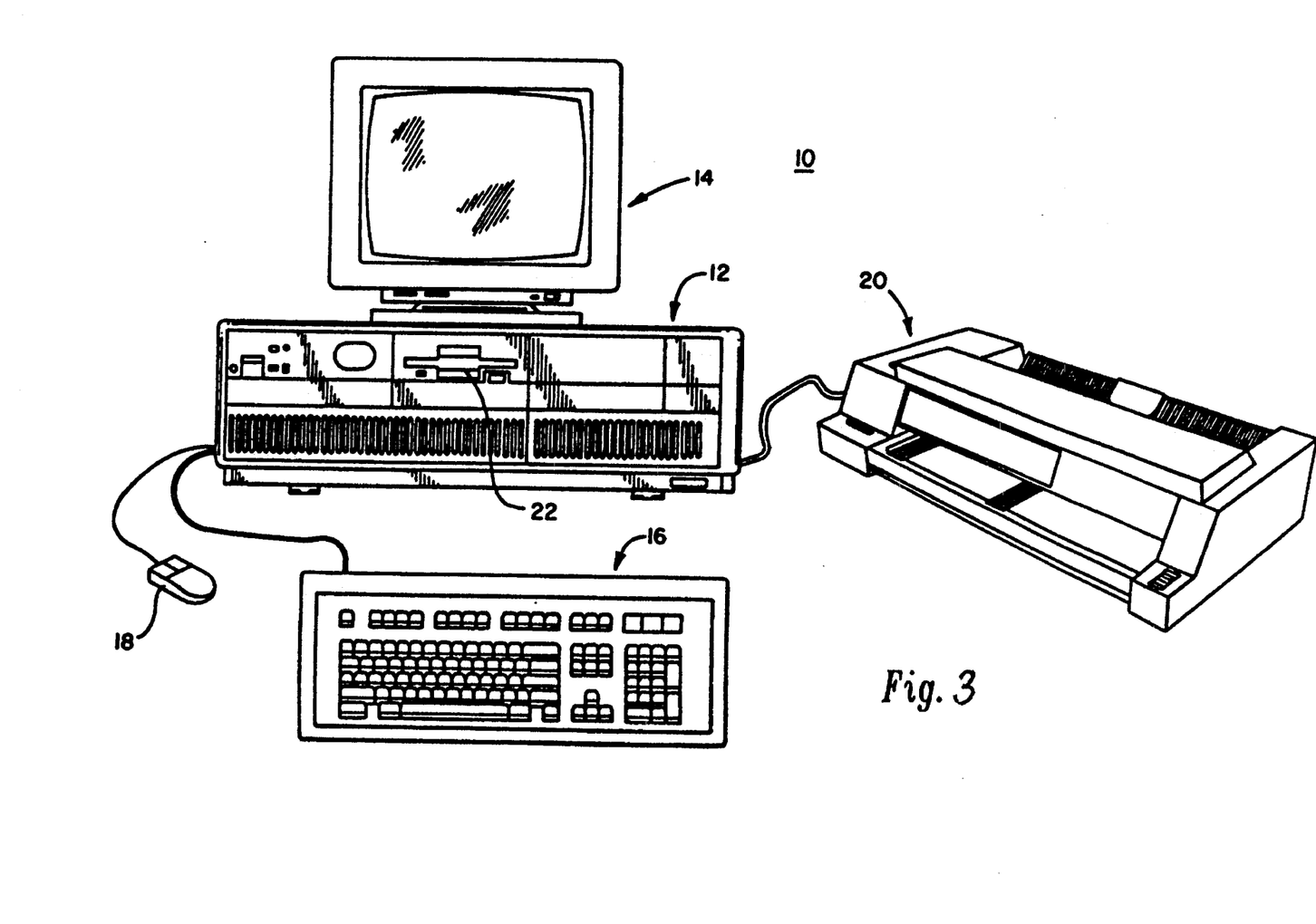
FIG. 3 illustrates a preferred embodiment of a data processing system which employs the method and system of the present invention.

With reference now to the figures and in particular with reference to FIG. 3, there is illustrated a data processing system which employs the method and system of the present invention. Data processing system 10 includes system unit 12, display device 14, keyboard 16, and mouse 18. As is well-known in the art, a user may input data to system unit 12 utilizing keyboard 16 or mouse 18. In addition, a user may input data to system unit 12 by retrieving data from a floppy diskette (not illustrated) inserted into floppy disk drive 22. System unit 12 outputs data to a user via display device 14 or printer 20. According to a preferred embodiment of the present invention, system unit 12 includes a superscalar pipelined microprocessor, such as one of the PowerPC RISC Microprocessors available from IBM Microelectronics.

Figure 4:
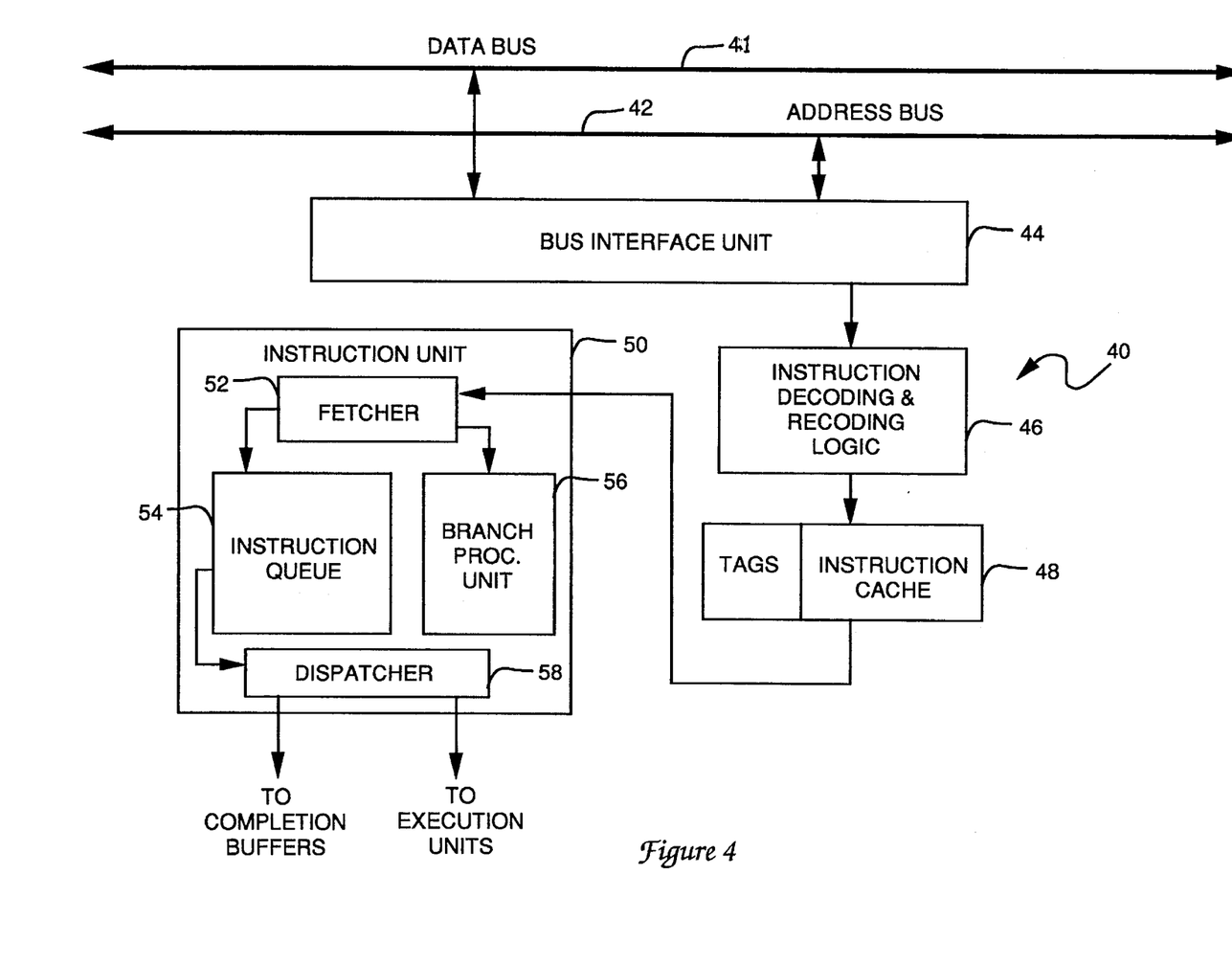
FIG. 4 depicts a block diagram of the instruction processing subsystem of a processor which utilizes the method and system of the present invention.

Referring now to FIG. 4, there is depicted a preferred embodiment of an instruction processing subsystem of a superscalar pipelined processor employing the method and system of the present invention. As illustrated, instruction processing subsystem 40 includes bus interface unit 44, instruction decoding and recoding (IDR) logic 46, instruction cache 48, and instruction unit 50. Instruction unit 50 further includes fetcher 52, instruction queue 54, branch processing unit 56, and dispatcher 58.

During execution of a software routine, fetcher 52 determines the address of the next instruction to be fetched based upon addresses provided by the processor completion unit (not illustrated) and branch processing unit 56. As will be understood by those skilled in the art, instruction unit 50 first attempts to locate the requested instruction within instruction cache 48, which in a preferred embodiment is an 4-Kbyte, 2-way set associative cache, by matching the tag portion of the requested instruction's address with an address tag stored within instruction cache 48. If a cache miss occurs, the instruction request is forwarded to bus interface unit 44, which transmits the request to a lower level of memory via address bus 42. In response to the instruction request, the lower level memory that stores the requested instruction will return a set of instructions including the requested instruction to bus interface unit 44 via data bus 41. Each instruction fetched from lower level memory is then processed by IDR logic 46 prior to storage of the fetched instructions within instruction cache 48. Those skilled in the art will appreciate that although IDR logic 46 will vary between processors due to architectural and instruction set differences, logic embodying the present invention may be realized utilizing well-known logic derivation techniques.

Figure 5:
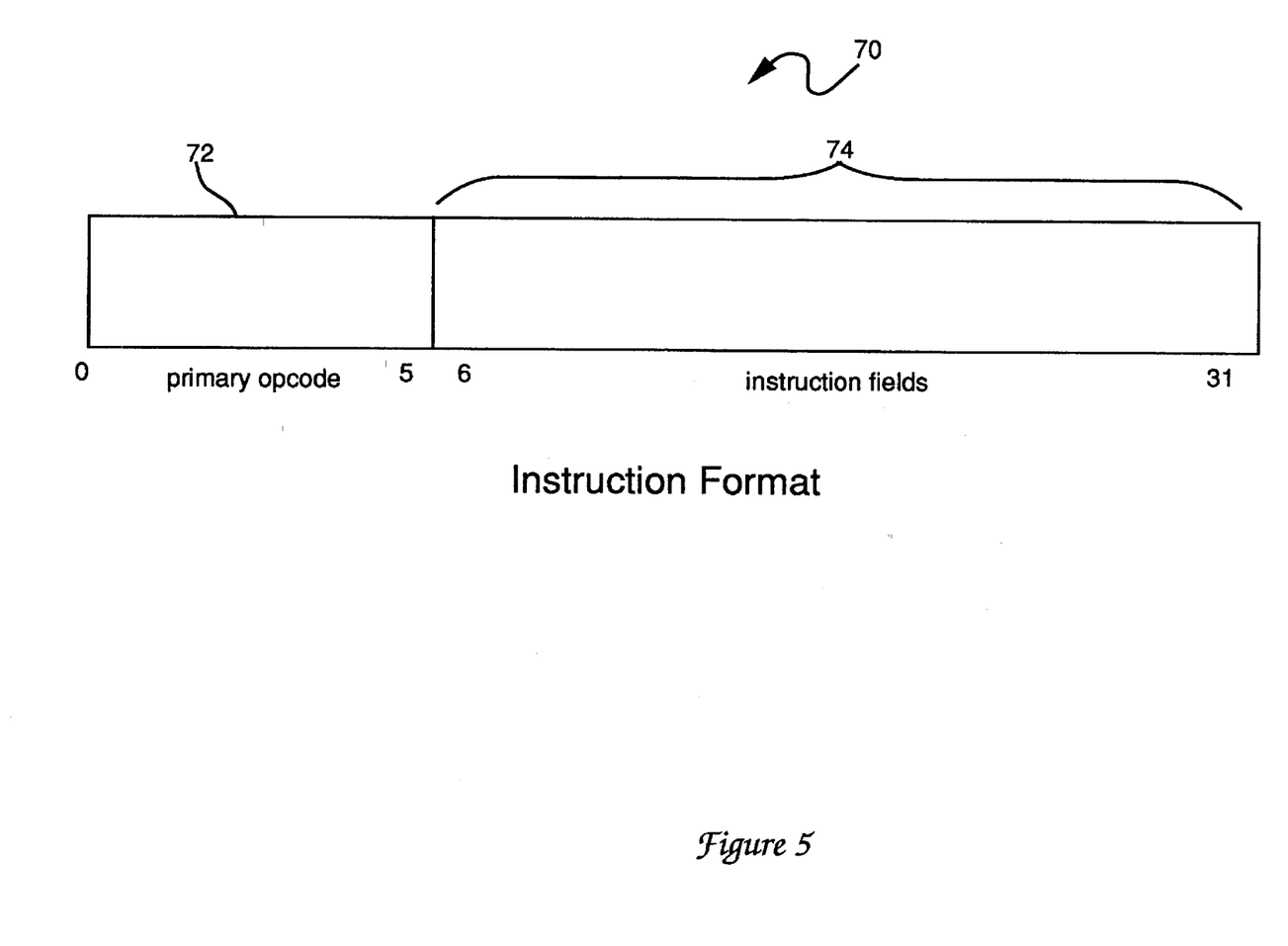
FIG. 5 illustrates an instruction format utilized in a preferred embodiment of the present invention.

IDR logic 46 predecodes each instruction input from bus interface unit 44 to detect two types of noneffective instructions: instructions having invalid (illegal) opcodes, and instruction which do not change the state of the processor. With reference now to FIG. 5, there is illustrated a diagram depicting the instruction format utilized in a preferred embodiment of the present invention. As depicted, instruction 70 comprises primary opcode 72 (bits 0–5) and instruction fields 74 (bits 6–31). In contrast to the prior art systems depicted in FIGS. 1 and 2, which only partially decode primary opcode 72 to determine the instruction type of instruction 70, IDR logic 46 of the present invention fully decodes primary opcode 72 by performing a 6-bit comparison between primary opcode 72 and valid opcodes within the instruction set of the processor. If primary opcode 72 of instruction 70 is invalid, that is, not within the processor's instruction set, IDR logic 46 recodes primary opcode 72 into a standard opcode indicating that instruction 70 is an illegal instruction. Those skilled in the art will appreciate that any opcode distinctive from the opcodes of valid instructions may be utilized to signify that instruction 70 is an illegal instruction. Instruction 70 is then stored within instruction cache 48. It is important to note that unlike the prior art system illustrated in FIG. 2, which stores illegal instructions in association with flag bits to specify that the associated instructions are illegal, the present invention stores recoded illegal instructions within instruction cache 48 without utilizing additional flag bits. Thus, the present invention increases the number of instructions which may be stored within an instruction cache as compared with prior art systems.

Returning to FIG. 4, when a recoded illegal instruction 70 is later requested by fetcher 52 within instruction unit 50, instruction 70 is read from instruction cache 48 and loaded into instruction queue 54. After the previously loaded instructions have been processed, instruction 70 is loaded into dispatcher 58. In the preferred embodiment of the present invention depicted FIG. 4, recoded illegal instruction 70 is dispatched directly to a completion buffer (not illustrated). Then, after instructions preceding illegal instruction 70 in the instruction stream have completed, the processor invokes an appropriate exception (interrupt) handler. Because illegal instructions having invalid primary opcodes are detected before they are loaded into dispatcher 58, the decoding logic within dispatcher 58 is greatly reduced as compared with the prior art system of FIG. 1. In superscalar processors having a wide instruction dispatch bandwidth and narrow instruction fetch bandwidth, the space savings on the processor chip can amount to as much as 0.5 min.

In addition to determining if primary opcode 72 of instruction 70 is valid when instructions are loaded from lower level memory, IDR logic 46 determines whether instruction 70 is a noneffective instruction which would not affect the state of the processor. That is, IDR logic 46 determines if execution of instruction 70 would affect the value of any architected register within the processor. Noneffective instructions which do not effect the state of the processor include, for example, adds and subtracts of 0 where the source and destination registers are identical and multiplies and divides by 1 where the source and destination registers are identical. When IDR logic 46 detects a noneffective instruction 70 which would not affect the state of the processor, IDR logic 46 recodes primary opcode 72 of instruction 70 into the standard no-operation (no-op) format for the processor's instruction set.

Figure 6:
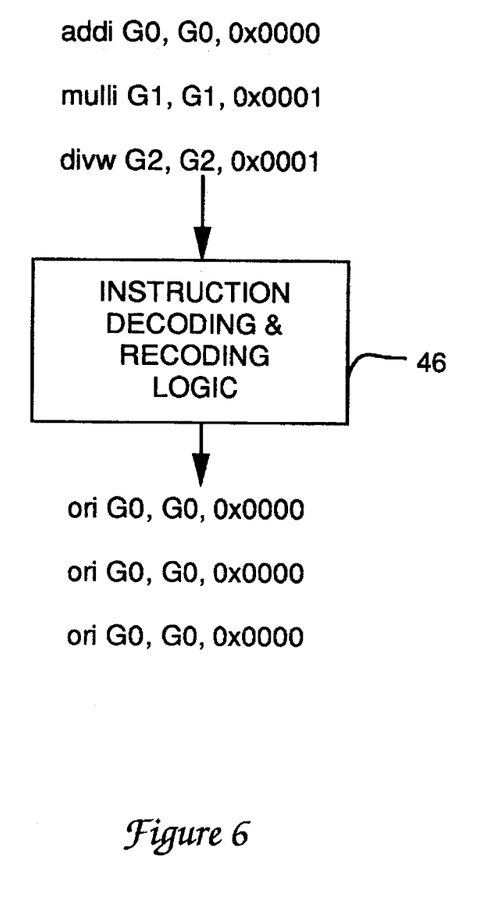
FIG. 6 depicts examples of instructions which are recoded prior to dispatch according to the method and system of the present invention.

Referring now to FIG. 6, there are depicted examples of noneffective instructions that are recoded by IDS logic 46 in a preferred embodiment of the present invention in which the processor comprises a PowerPC RISC Microprocessor. As illustrated, three instructions, a divide by 1, a multiply by 1 and an add of 0, each with identical source and destination registers, are input to IDR logic 46. If executed, these instructions would not alter the state of the processor since the values within the specified registers would remain unchanged. According to the present invention, IDR logic 46 recodes each of the three noneffective instructions into the no-op instruction format for the PowerPC instruction set (ori G0, G0, 0x0000), which is a single cycle instruction.

Returning to FIG. 4, after IDR logic 46 has recoded instruction 70 into a standard no-op format, instruction 70 is stored within instruction cache 48. Subsequently, instruction 70 may be loaded by fetcher 52 of instruction unit 50. Since a standard no-op instruction is a sequential (nonbranch) instruction, fetcher 52 will forward instruction 70 to instruction queue 54. According to a preferred embodiment of the present invention, instruction queue 54 removes no-op instructions from the instruction stream prior to being loaded by dispatcher 58, thereby enhancing processor efficiency. Even in embodiments of the present invention which do not fold no-op instructions out of the instruction stream, processor performance is greatly enhanced by the recoding of noneffective instructions since no-op instructions typically execute within a single processor cycle. In contrast, noneffective instructions like those depicted in FIG. 6 may take multiple processor cycles to complete.

As has been described, the present invention provides a method and system which enable a processor to predecode and recode noneffective instructions prior to dispatch. In addition to improving cache efficiency and reducing processor chip area requirements, the present invention enhances processor performance by placing the illegal instruction detection logic in a noncritical timing path. In contrast to the prior art system depicted in FIG. 1, which delays the dispatch (and therefore execution) of each instruction by decoding each instruction within the dispatcher, the present invention delays the execution of at most one instruction within each set of instructions returned from lower level memory since at most one instruction is immediately required to maintain the instruction stream within instruction queue 54.

While the invention has been particularly shown and described with reference to a preferred embodiment, it will be understood by those skilled in the art that various changes in form and detail may be made therein without departing from the spirit and scope of the invention.

What is claimed is:

1. A method within a data processing system of processing instructions prior to execution by a processor including at least one execution unit, wherein instructions are stored within a memory within said data processing system, said method comprising:

retrieving a plurality of instructions from said memory;

decoding a selected instruction among said plurality of instructions to determine if execution of said selected instruction would alter data stored within one of a plurality of data registers within said processor;

in response to a determination that execution of said selected instruction would not alter data stored within one of said plurality of data registers within said processor, recoding said selected instruction into a first instruction format prior to dispatching said selected instruction to said at least one execution unit; and thereafter, discarding said selected instruction in said first instruction format.

2. The method of processing instructions of claim 1, wherein said step of decoding said selected instruction comprises determining if said selected instruction has an invalid opcode.

3. The method of processing instructions of claim 2, wherein said processor includes a completion buffer, said method further comprising:

in response to said determination that said selected instruction has an invalid opcode, dispatching said selected instruction to said completion buffer.

4. The method of processing instructions of claim 2, and further comprising:

in response to a determination that said selected instruction has an invalid opcode, recoding said selected instruction into a second instruction format prior to dispatching said selected instruction.

5. The method of processing instructions of claim 4, and further comprising:

subsequent to said step of recoding said selected instruction into said second instruction format, storing said selected instruction within an instruction cache.

6. The method of processing instructions of claim 5, and further comprising:

thereafter, dispatching said selected instruction in said second instruction format to said at least one execution unit.

7. A data processing system, said data processing system comprising:

at least one execution unit that performs data processing operations specified by instructions input to said at least one execution unit;

a plurality of data registers;

a first portion of memory which that stores instructions that may be executed by said at least one execution unit;

means for retrieving a plurality of instructions from said first portion of memory;

decoding logic, coupled to said means for retrieving, which detects if execution of a selected instruction among said plurality of instructions retrieved from said memory would alter data stored within one of said plurality of data registers;

recoding logic, which in response to a detection that execution of said selected instruction would not alter data stored within one of said plurality of data registers, recodes said selected instruction into a first instruction format prior to dispatching said selected instruction to said at least one execution unit; and discarding logic that discards said selected instruction in said first instruction format.

8. The data processing system of claim 7, and further comprising:

an instruction cache for storing instructions among said plurality of instructions that are not discarded.

9. The data processing system of claim 7, wherein said decoding logic includes means for determining if said selected instruction has an invalid opcode.

10. The data processing system of claim 9, and further comprising:

a completion buffer for storing completed instructions; and means, responsive to said determination that said selected instruction has an invalid opcode, for dispatching said selected instruction to said completion buffer.

11. The data processing system of claim 9, and further comprising:

recoding logic, responsive to a determination that said selected instruction has an invalid opcode, for recoding said selected instruction into a second instruction format.

* * * * *